United States Patent [19]

Kostikov et al.

[11] 4,420,539
[45] Dec. 13, 1983

[54] PROCESS FOR PRODUCING ANTIFRICTION MATERIALS

[76] Inventors: Valery I. Kostikov, ulitsa Marii Ulyanovoi, 9 korpus 2, kv. 12, Moscow; Jury I. Koshelev, Oktyabrsky prospekt, 356, kv. 8; Vasily D. Telegin, Oktyabrsky prospekt, 306, kv. 71, both of Ljubertsy Moskovskoi oblasti; Alexandr A. Khomenko, ulitsa Perovskaya, 40, korpus 2, kv. 8; Evgeny F. Filimonov, Frunzensky val 16 kv. 67, both of Moscow, all of U.S.S.R.

[21] Appl. No.: 346,038

[22] PCT Filed: Jun. 9, 1980

[86] PCT No.: PCT/SU80/00101

§ 371 Date: Jan. 26, 1982

§ 102(e) Date: Jan. 26, 1982

[87] PCT Pub. No.: WO81/03452

PCT Pub. Date: Dec. 10, 1981

[30] Foreign Application Priority Data

Jan. 28, 1978 [SU] U.S.S.R. .............................. 2589530
Aug. 29, 1980 [FR] France .............................. 80 18808

[51] Int. Cl.³ .................. B32B 9/06; B32B 15/04; B05D 3/00; B05D 3/02
[52] U.S. Cl. .................... 428/450; 264/60; 264/65; 427/294; 427/314; 427/355; 427/401
[58] Field of Search .............. 427/294, 314, 355, 401; 264/60, 65; 428/450

[56] References Cited

U.S. PATENT DOCUMENTS

| | | | |
|---|---|---|---|
| 3,619,430 | 11/1971 | Hiratsuka et al. | 427/294 X |
| 3,850,668 | 11/1974 | Heffer | 427/294 X |
| 3,949,804 | 4/1976 | Kaneko et al. | 427/294 X |
| 4,221,831 | 9/1980 | Kostikov et al. | 427/294 X |

*Primary Examiner*—Michael R. Lusignan
*Attorney, Agent, or Firm*—McAulay, Fields, Fisher, Goldstein & Nissen

[57] ABSTRACT

A process for producing antifriction materials comprising heat-treatment of a carbonaceous base—a siliconized graphite consisting of 5 to 25% by weight of silicon, 25 to 55% by weight of silicon carbide, carbon being the balance, in a vacuum of fron $10^{-1}$ to $10^{-3}$ mm Hg at a temperature within the range of from 1,500° to 2,000° C. for a period of from 15 to 60 minutes, followed by impregnation of the carbonaceous base with metals or alloys thereof.

20 Claims, No Drawings

PROCESS FOR PRODUCING ANTIFRICTION MATERIALS

FIELD OF THE INVENTION

The present invention relates to the art of manufacture of structural antifriction materials.

BACKGROUND OF THE INVENTION

Known in the art is a process for the production of an antifriction material by impregnating a carbonaceous base with molten copper and silver. The process comprises placing the carbonaceous base and the metals in the solid state in an electroconducting vessel and heating, by means of electric current to the melting temperature of the metals (cf. French Pat. No. 1,368,129 Cl. C 04 B, published June 31, 1964).

Using this process it is, however, not always possible to obtain an antifriction material having a uniform degree of impregnation of the carbonaceous base which results in substantial non-uniformity of its properties relative to the entire volume thereof.

Also known in the art is a process for the production of antifriction materials by impregnating a carbonaceous base having a density of from 1.68 to 1.79 g/cm$^3$ with metals or alloys thereof whose melting point lies within the range of from 200° to 1,000° C. in an autoclave under an inert gas pressure (cf. U.S. Pat. No. 3,619,430 Cl. 264-29, published Nov. 9, 1971).

The antifriction materials produced by this process have insufficient wear-resistance (wear rate is 0.8–1.0 μm/hr) and a low mechanical strength (compression strength is 2,300 kgf/cm$^2$), wherefore it is substantially impossible to use these materials in friction units operating in liquid media containing abrasive matter and in fluid (bulk) materials.

SUMMARY OF THE INVENTION

The present invention is directed to the provision, in a process for the production of antifriction materials comprising impregnation of a carbonaceous base with metals or alloys thereof, of such a carbonaceous base and such conditions for the treatment thereof which would enable the production of antifriction materials with improved mechanical strength characteristics and a low wear rate.

This object is accomplished by a process for the production of antifriction materials comprising impregnation of a carbonaceous base with metals or alloys thereof, wherein according to the present invention as the carbonaceous base use is made of a siliconized graphite consisting of 5 to 25% by weight of silicon, 25 to 55% by weight of silicon carbide, carbon being the balance, and prior to the impregnation the siliconized graphite is thermally treated in a vacuum of from $10^{-1}$ to $10^{-3}$ mm Hg at a temperature within the range of from 1,500° to 2,000° C. for a period of from 15 to 60 minutes.

The process according to the present invention makes it possible to obtain antifriction materials with increased mechanical strength characteristics (compression strength is as high as 4,300 kgf/cm$^2$) and a high wear resistance (wear rate is as low as 0.3 μm/hr) which, in turn, enables the use of these antifriction materials in friction units operating in liquid media containing abrasive matter and in bulk materials. The process is simple, makes use of standard equipment, is non-hazardous and highly efficient. All the process parameters during the manufacture of antifriction materials can be easily and reliably controlled.

BEST MODE FOR CARRYING-OUT THE INVENTION

The process for the production of antifriction materials according to the present invention is effected in the following manner.

As the starting carbonaceous base for impregnation with metals or alloys thereof use is made of a siliconized graphite. For the production of siliconized graphite use can be made of porous carbon blanks calcined (at a temperature of from 700° to 1,000° C.) or graphitized (at a temperature of from 2,000° to 3,000° C.), obtained from various carbonaceous fillers and binders. For example, use can be made of carbonaceous porous blanks based on the following carbonaceous fillers: petroleum and coal cokes, artificial and naturally-occurring graphites, carbon fabrics and fibres, as well as the following binders: coal-tar pitches, petroleum pitches, phenolic and other thermosetting resins. As the carbonaceous porous materials use is made of blanks with open-pore content of 25–50% (by the total volume of the blank) and with a pore size of from 30 to 120 μm.

The preparation of the carbonaceous base - siliconized graphite is carried out in any conventional manner by heating carbonaceous blanks having a density of 0.80–1.70 g/cm$^3$ in an electric furnace in an atmosphere of inert gases (argon, nitrogen, helium) under vacuum of $10$–$10^{-1}$ mm Hg to a temperature of from 1,800° to 2,100° C. and impregnation of the heated carbonaceous blanks with a melt of silicon over a period of from 15 to 30 minutes. The silicon-impregnated blanks (siliconized graphite) are removed from the furnace at a temperature not exceeding 800° C.

The thus-produced carbonaceous base is heat-treated in electrovacuum furnaces (under vacuum of from $10^{-1}$ to $10^{-3}$ mm Hg) at a temperature within the range of from 1,500° to 2,000° C. for a period of from 15 to 60 minutes.

After the heat-treatment the carbonaceous base (siliconized graphite) is impregnated with metals or alloys thereof following conventional techniques in vacuum or in inert gases under pressure. As the metals use can be made, for example, of copper, silver, aluminum, gold, platinum, lead, tin, zinc, antimony, bismuth, indium. Among alloys use can be made of, for example, an alloy of antimony and bismuth, iron-antimony alloy, lead-tin alloy, tin- or lead-based babbit alloys, various antifriction bronze types such as those based on copper and lead; copper, lead and nickel.

After impregnation of the carbonaceous base (siliconized graphite) with metals or alloys thereof the carbonaceous base is machined to give articles of a predetermined size and shape.

For a better understanding of the present invention some specific examples illustrating its particular embodiments are given hereinbelow. In all the examples use is made of the carbonaceous base (siliconized graphite) shaped as a ring with the dimensions: outside diameter 60 mm, inside diameter 40 mm, height 20 mm. The data illustrating mechanical strength and wear-resistance of the antifriction materials produced in the Examples given hereinbelow and compared with those of U.S. Pat. No. 3,619,430 are shown in the Table following the Examples.

EXAMPLE 1

A ring of siliconized graphite having the composition, in percent by weight: silicon—5, silicon carbide—55, carbon—40 is heated to the temperature of 1,500° C. at the rate of 50° C./min in an electric furnace under vacuum of $10^{-1}$ mm Hg and maintained at this temperature for 15 minutes. Thereafter, a graphite crucible is placed into the furnace and the ring together with copper are charged into the crucible, heated to the temperature of 1,100° C. under vacuum of $10^{-1}$ mm Hg and the ring is kept in the melt of copper at the above-specified temperature for 5 minutes. Then the temperature is lowered to 800° C. and the ring is removed from the furnace.

EXAMPLE 2

An antifriction material is produced in a manner similar to that described in the foregoing Example 1. The difference resides in that use is made of a siliconized graphite ring having the following composition, percent by weight: silicon—25, silicon carbide—25, carbon—50. The heat-treatment of the ring is effected in vacuum of $10^{-2}$ mm Hg at the temperature of 1,800° C. for 35 minutes.

EXAMPLE 3

An antifriction material is produced following the procedure similar to that of Example 1 hereinbefore. The difference resides in that use is made of a ring of a siliconized graphite having the following composition, percent by weight: silicon—15, silicon carbide—42, carbon—43. The heat-treatment of the ring is carried out in vacuum of $10^{-3}$ mm Hg at the temperature of 2,000° C. for 60 minutes.

EXAMPLE 4

A ring of a siliconized graphite having the following composition, percent by weight: silicon—10, silicon carbide—48, carbon—52 is heat-treated in vacuum of $10^{-2}$ mm Hg at the temperature of 1,700° C. for 40 minutes, followed by impregnation with an antifriction bronze of the following composition, percent by weight: lead—27-33, copper—the balance. The impregnation procedure is effected as in Example 1 hereinbefore.

EXAMPLE 5

A ring of a siliconized graphite having the following composition, percent by weight: silicon—17, silicon carbide—39, carbon—44, is subjected to heat-treatment in vacuum of $10^{-1}$ mm Hg at the temperature of 1,600° C. for 20 minutes. Then the ring is impregnated with a molten antimony-iron alloy (weight ratio of antimony to iron is 85:15) following the procedure described in Example 1.

EXAMPLE 6

A ring of a siliconized graphite having the following composition, percent by weight: silicon—23, silicon carbide 29, carbon—48, is subjected to heat-treatment in vacuum of $10^{-1}$ mm Hg at the temperature of 1,900° C. for 25 minutes. Then the ring is impregnated with a babbit having the following composition, percent by weight: antimony—10-12, copper—5.5-6.5, tin—the balance. The impregnation is carried out at the temperature of 500° C. in the atmosphere of nitrogen under the pressure of 20 atm for 15 minutes. After cooling of the furnace to 250° C. the ring is removed therefrom.

EXAMPLE 7

A ring of a siliconized graphite having the following composition, percent by weight: silicon—12, silicon carbide—46, carbon—42, is subjected to heat-treatment in vacuum of $10^{-2}$ mm Hg at the temperature of 1,800° C. for 30 minutes. Then the ring is impregnated with a molten lead-tin alloy (the ratio of lead to tin in the melt is 95:5 by weight) following the procedure described in Example 6 hereinbefore.

EXAMPLE 8

A ring of a siliconized graphite having the following composition, percent by weight: silicon—21, silicon carbide—33, carbon—46 is subjected to a heat-treatment in vacuum of $10^{-3}$ mm Hg at the temperature of 1,800° C. for 30 minutes. Then the ring is impregnated with an antifriction bronze of the following composition, percent by weight: lead—57-63, nickel—1.0-6.6, copper—the balance. The impregnation procedure is similar to that described in Example 1.

EXAMPLE 9

A ring of a siliconized graphite having the following composition, percent by weight: silicon—15%, silicon carbide—41%, carbon—44% is subjected to heat-treatment in vacuum of $10^{-1}$ mm Hg at the temperature of 2,000° C. for 17 minutes. Then the ring is impregnated with a melt of silver at the temperature of 1,100° C. in the atmosphere of argon under the pressure of 10 atm for 15 minutes.

EXAMPLE 10

A ring of a siliconized graphite having the following composition, percent by weight: silicon—7, silicon carbide—49, carbon—44, is subjected to heat-treatment in vacuum of $10^{-3}$ mm Hg at the temperature of 1,500° C. for 40 minutes, followed by impregnation with a melt of gold following the procedure described in Example 9 hereinabove.

EXAMPLE 11

A ring of a siliconized graphite having the following composition, percent by weight: silicon—24, silicon carbide—27, carbon—49, is subjected to heat-treatment in vacuum of $10^{-1}$ mm Hg at the temperature of 1,750° C. for 50 minutes. Then the ring is impregnated with a melt of aluminum at the temperature of 700° C. in the atmosphere of argon under the pressure of 10 atm for 15 minutes.

EXAMPLE 12

A ring of a siliconized graphite having the following composition, percent by weight: silicon—15, silicon carbide—42, carbon—43, is subjected to heat-treatment in vacuum of $10^{-2}$ mm Hg at the temperatures of 1,800° C. for 35 minutes. Then the ring is impregnated with a melt of antimony-bismuth alloy (the weight ratio of antimony to bismuth is 1:1) following the procedure described in Example 11.

EXAMPLE 13

A ring of a siliconized graphite having the following composition, percent by weight: silicon—18, silicon carbide—37, carbon—45 is subjected to heat-treatment in vacuum of $10^{-1}$ mm Hg at the temperature of 1,950°

C. for 55 minutes. Thereafter, the ring is impregnated with a melt of platinum at the temperature of 1,800° C. in the atmosphere of argon under the pressure of 10 atm for 15 minutes.

EXAMPLE 14

A ring of a siliconized graphite having the following composition, percent by weight: silicon—8, silicon carbide—51, carbon—41, is subjected to heat-treatment in vacuum of $10^{-1}$ mm Hg at the temperature of 1,550° C. for 27 minutes. Then the ring is impregnated with a melt of indium at the temperature of 350° C. in the atmosphere of argon under the pressure of 10 atm for 15 minutes.

The antifriction materials produced according to Examples 1 through 14 and U.S. Pat. No. 3,619,430 are tested for wear-resistance and compression strength. The wear-resistance tests are carried out under the load of 10 kgf/cm$^2$ at the speed of gliding along steel (HRC=50-55) of 0.5 cm/sec in water containing sand with a particle size of from 40 to 100 μm at its concentration of 50 g/l in water. The testing temperature is 50° to 70° C. The wear-resistance is evaluated by the rate of wear and state of working surfaces of the contacting friction couples.

As it is seen from the Table given hereinbelow, the use of the present invention makes it possible to increase the compression strength of antifriction materials by 1.2-2.0 times and to reduce the rate of wear by 1.6-2.0 times, as compared to similar characteristics of the antifriction material produced according to U.S. Pat. No. 3,619,430.

Furthermore, additional tests have revealed that the antifriction material produced by the process according to the present invention ensures a normal operation of a friction couple without jamming and a sharp temperature increase under dry and semi-dry friction conditions, i.e. under the conditions of start-up and shutdown of the equipment. In contrast thereto, on the working surface of the antifriction material produced according to U.S. Pat. No. 3,619,430, under these conditions, the formation of deep recessions and scratches is observed.

TABLE

| Example No. | Siliconized graphite, wt. % | | | Heat-treatment | | |
|---|---|---|---|---|---|---|
| | Silicon | Silicon carbide | Carbon | Vacuum, mm Hg | Temperature, °C. | Time, minutes |
| 1 | 5 | 55 | 40 | $10^{-1}$ | 1,500 | 15 |
| 2 | 25 | 25 | 50 | $10^{-2}$ | 1,800 | 35 |
| 3 | 15 | 42 | 43 | $10^{-3}$ | 2,000 | 60 |
| 4 | 10 | 48 | 42 | $10^{-2}$ | 1,700 | 40 |
| 5 | 17 | 39 | 44 | $10^{-1}$ | 1,600 | 20 |
| 6 | 23 | 29 | 48 | $10^{-1}$ | 1,900 | 25 |
| 7 | 12 | 46 | 42 | $10^{-2}$ | 1,800 | 30 |
| 8 | 21 | 33 | 46 | $10^{-3}$ | 1,800 | 30 |
| 9 | 15 | 41 | 44 | $10^{-1}$ | 2,000 | 17 |
| 10 | 7 | 49 | 44 | $10^{-3}$ | 1,500 | 40 |
| 11 | 24 | 27 | 49 | $10^{-1}$ | 1,750 | 50 |
| 12 | 15 | 42 | 43 | $10^{-2}$ | 1,800 | 35 |
| 13 | 18 | 37 | 45 | $10^{-1}$ | 1,950 | 55 |
| 14 | 8 | 51 | 41 | $10^{-1}$ | 1,550 | 27 |
| According to U.S. Pat. No. 3,619,430 | Non-siliconized carbonaceous base | | | — | — | — |

| Impregnation agent | | Properties of antifriction materials | | |
|---|---|---|---|---|
| Metal | alloy, wt. % | Density, g/cm$^3$ | Compression strength, kgf/cm$^2$ | Wear rate μm/hr |
| Cu | — | 2.72 | 4.300 | In Examples 1 to 14 the rate of wear is within the range of from 0.3 to 0.5 μm/hr. The working surfaces of the friction couple have no visible signs of wear |
| Cu | — | 3.63 | 2.780 | |
| Cu | Pb-27-33 | 3.11 | 3.750 | |
| — | Cu-the balance Sb-85 | 3.17 | 4.100 | |
| — | Fe-15 Sb-10-12 Cu-5.5-6.5 | 3.07 | 3.500 | |
| — | Sn-the balance Pb-95 | 3.82 | 2.800 | |
| — | Sn-5 Pb-57-63 Ni-1.0-6.6 | 3.33 | 3.900 | |
| — | Cu-the balance | 3.57 | 3.250 | |
| Ag | — | 3.27 | 3.600 | |
| Au | — | 3.14 | 4.100 | |
| Al | — | 2.67 | 2.800 | |
| — | Sb-50 Bi-50 | 3.09 | 3.670 | |
| Pt | — | 3.32 | 3.900 | |
| In | — | 3.23 | 3.800 | |
| — | Sb-70 | 2.67 | 2.300 | 0.8–1.0 Working surfaces of the friction couple with signs of wear |
| — | Cu-30 | | | |

INDUSTRIAL APPLICABILITY

The antifriction materials produced by the process according to the present invention can be useful in the manufacture of parts intended for operation in friction units of different kinds of equipment (e.g. in centrifugal sealed pumps with or without packing glands or therewithout, piston and rod pumps, screws, pipelines) transporting neutral, carrosine liquids and liquids containing abrasive matter such as scale, clay, sand and the like of various fineness, as well as bulk materials.

We claim:

1. A process of making antifriction products, comprising the steps of:
   heat treating a siliconized graphite base consisting of about 5 to about 25% by weight of silicon; about 25 to 55 percent by weight of silicon carbide, balance carbon, to a temperature of 1500° to 2000° C. under a vacuum of $10^{-1}$ to $10^{-3}$ mm Hg and then impregnating said base with friction-resistant metals or alloys thereof.

2. The process of claim 1, wherein said impregnating is effected by heating under pressure under an inert atmosphere.

3. The process of claim 1, wherein said heat treating is carried out for 15 to 60 minutes.

4. The process of claim 1, further including the step of machining said base after impregnation to give an article of predetermined size and shape.

5. The process of claim 1, wherein said metal is copper, gold, silver, platinum, lead, tin, zinc, antimony, aluminum, bismuth or indium.

6. The process of claim 1, wherein said alloy is an alloy of antimony-bismuth, iron-antimony, lead-tin, a tin- or lead-based babbitt alloys, or bronze.

7. The process of claim 1, wherein said impregnating is effected by heating in vacuum.

8. A friction resistant carbonaceous article having a compression strength up to 4300 kgf/cm$^2$ and a wear rate in the range of 0.3 to 0.5 μm/hr produced by the process of claim 1.

9. The process of claim 3, further including the step of machining said base after impregnation to give an article of predetermined size and shape.

10. The process of claim 9, wherein said metal is copper, gold, silver, platinum, lead, tine zinc, antimony, aluminum, bismuth or indium.

11. The process of claim 10, wherein said alloy is an alloy of antimony-bismuth, iron-antimony, led-tin, a tin or lead-based babbitt alloys, or bronze.

12. The process of claim 11, wherein said impregnating is effected by heating in vacuum.

13. The process of claim 11, wherein said impregnating is effected by heating under pressure under an inert atmosphere.

14. A friction resistant carbonaceous article having a compression strength up to 4300 kgf/cm$^2$ and a wear rate in the range of 0.3 to 0.5 μm/hr produced by the process of claim 13.

15. A friction resistant carbonaceous article having a compression strength up to 4300 kgf/cm$^2$ and a wear rate in the range of 0.3 to 0.5 μm/hr produced by the process of claim 12.

16. The process of claim 3, wherein said metal is copper, gold, silver, platinum, lead, tin, zinc, antimony, aluminum, dismuth or indium.

17. The process of claim 16, wherein said alloy is an alloy of antimony-bismuth; iron-antimony, lead-tin, a tin- or lead-based babbitt alloys, or bronze.

18. The process of claim 17, wherein said impregnating is effected by heating in vacuum.

19. The process of claim 17, wherein said impregnating is effected by heating under pressure under an inert atmosphere.

20. A friction resistant carbonaceous article having a compression strength up to 4300 kgf/cm$^2$ and a war rate in the range of 0.3 to 0.5 μm/hr produced by the process of claim 19.

* * * * *